Aug. 10, 1937. F. B. LOMAX 2,089,702
APPARATUS FOR FILTERING EGGS
Filed Jan. 26, 1935
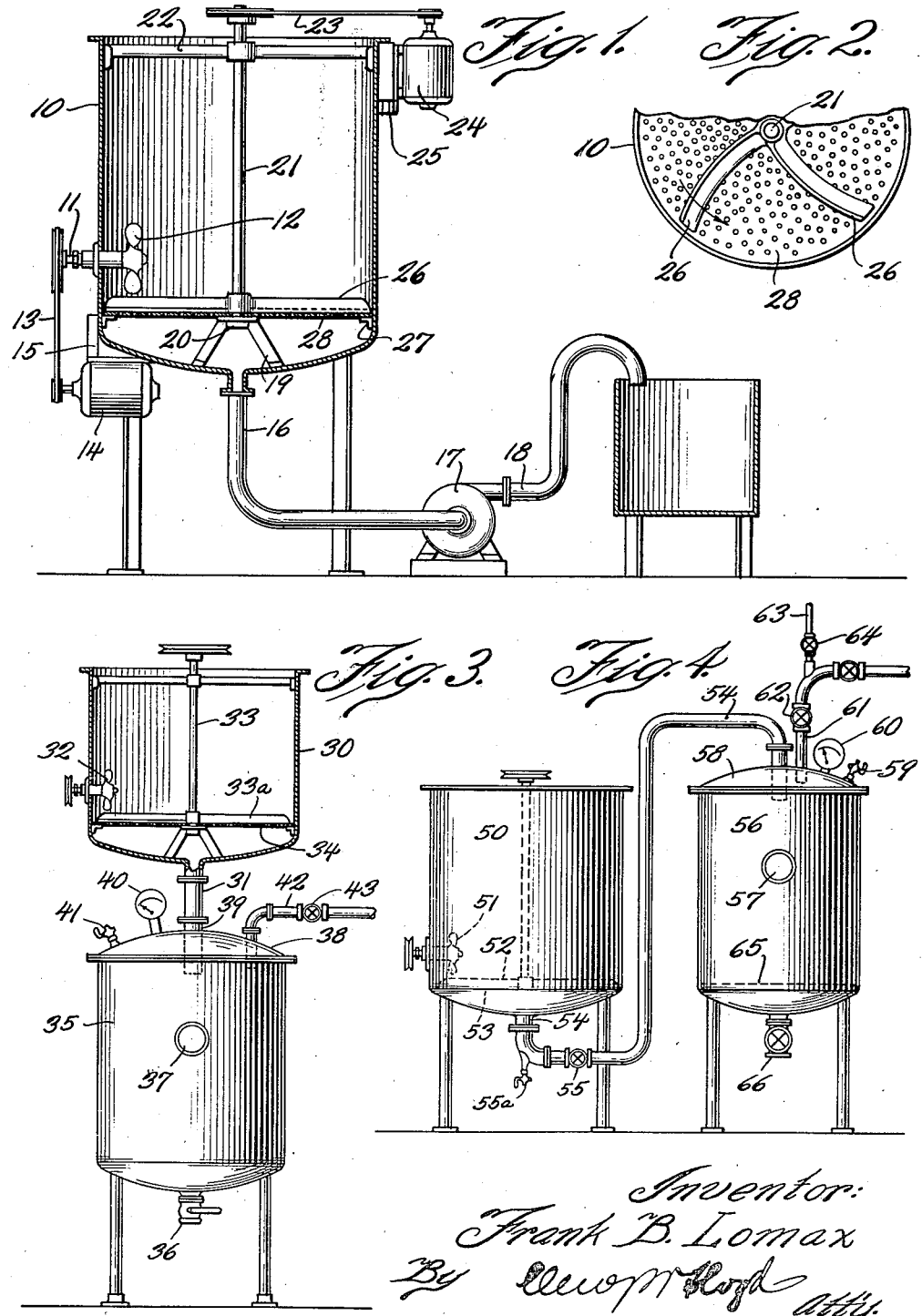

Patented Aug. 10, 1937

2,089,702

UNITED STATES PATENT OFFICE 2,089,702

APPARATUS FOR FILTERING EGGS

Frank B. Lomax, Chicago, Ill.

Application January 26, 1935, Serial No. 3,601

6 Claims. (Cl. 210—151)

The present invention relates to apparatus for filtering eggs without mechanically applied pressure.

Eggs are frozen and stored for use in the baking and confectionery trade. Fresh eggs are packed for this purpose. The meats, whites and yolks, of the eggs are separated from the shells. The egg meats are thoroughly mixed to provide a uniform color. Thereafter they are frozen solid to keep them in good condition.

Such frozen eggs are very extensively used by the trade, being more economical than eggs not so prepared and being more uniform in color and consistency than freshly broken eggs. Canners have aimed to produce frozen eggs free from foreign matter, such as fragments of egg shells which get into the meats as the shells are broken, dirt, and hard fibrous substances comprising in part the yolk sac. They have also endeavored to mix the eggs thoroughly so as to obtain a uniform color free from streaks. They have also strived to handle the eggs so that no air is incorporated into the egg meat mixture to produce foam.

In the present invention, the use of a pump in any form to transfer the egg meats or to press such meats through a filter may be avoided and suction and gravity may be used to transfer the eggs from the mixing tank and to run them through a filter.

The filter may comprise a wire mesh screening or a perforated metal sheet of such porosity that the fragments of shell or other undesirable matter cannot be forced through and will remain in the filter chamber. Part of the egg material, i. e., the chalaza may be disintegrated and pass through the filter. When disintegrated it mixes freely with the egg meats.

The main drawbacks to frozen canned eggs until filtering was adapted therefor was the presence of pieces of shells, dirt, unbroken chalaza, lumps, and the like, which materials affect the sightliness, the cleanliness, and purity of the product. By use of the herein described apparatus for removing these undesirable matters and the breaking up of the chalaza, and the intimate mixture of the broken eggs, the canned eggs are made more desirable and are more easily marketed for there is no settling out of any foreign matter after the eggs are stored and frozen as is common in unfiltered eggs.

The objects of the present invention, among others, include the provision of the following:

Apparatus for filtering eggs at a pressure limited to that of the atmosphere;

Apparatus for filtering eggs by suction; and

Mechanical means for cleansing apparatus for filtering eggs during operation.

These objects and such other objects as may hereinafter appear, are obtained by the novel combination, unique construction, and improved arrangement of the several elements comprising the invention, several embodiments of which are illustrated in the accompanying single sheet of drawing hereby made a part of this specification, and in which:

Figure 1 is a diametric vertical section through one form of apparatus embodying the subject matter of the present invention;

Figure 2 is a fragmentary plan view of scrapers and associated filter used in the apparatus illustrated in Figure 1;

Figure 3 is a view similar to Figure 1 and in which a storage tank is employed beneath the filter; and Figure 4 is another embodiment of the elements illustrated in Figure 3, the arrangement of the parts being different.

Like reference characters are used to designate similar parts in the following description and in the drawing.

Figure 1 illustrates a hopper or tank 10 of suitable depth having a side wall with an aperture in which a shaft 11 is journaled. Within the tank 10 the shaft 11 has a propeller 12 for mixing egg material stored in the tank. At its outside, the shaft 11 has a pulley to receive a belt 13. The belt 13 is driven by a drive pulley on a motor 14 which may be suspended on a bracket 15 or in any suitable manner beneath the tank 10 or in juxtaposition thereto.

The bottom central section of the tank opens into a conduit 16 which extends to a suction pump 17 suitably mounted upon a base or otherwise disposed. The suction pump 17 has a discharge conduit 18 whereby egg material which is drawn from the tank 10 and which passes through the pump 17 is deposited in a can or other suitable vessel provided for its reception.

A spider 19 is mounted at the central interior portion of the tank 10 and provides a journal 20 for a vertical shaft 21. The shaft 21 is journalled in a second spider or arbor 22 adjacent the top of the tank 10. Shaft 21 is provided with a pulley, driven by a belt 23 extending thereabout and about a driving pulley on a motor 24 illustrated as mounted upon a bracket 25 at the side of the tank 10.

The lower end of the shaft 21 has thereabout one or more scrapers 26 of the type shown in plan view in Figure 2. Each scraper 26 is curved longitudinally and transversely to provide a suitable pitch tending to force material with which it comes into contact through the filter. An angle iron rack or other support 27 is mounted about the internal periphery of the tank in a horizontal plane near its bottom. Disposed upon the support 27 is a perforate disc 28 comprising a filter. The filter 28, in addition to being supported at its edges by rack 27 is supported at its center by the arbor 19 heretofore described. Suitable fastening means (not shown) may lock the filter in position. The filter 28 thus is securely mounted against buckling. The screen may be divided into segments the edges of which are overlapping or tightly sealed. A segmental arrangement facilitates removal for cleansing.

The screen may be of perforated sheet metal or of wire mesh. Such wire mesh may be reinforced. The porosity of the filter is such that appreciable portions of egg shell and other solid bodies will not pass therethrough. Its character is such that it either disintegrates the chalaza or removes it, or disintegrates a part of it and removes the remaining portion thereof.

The device described is operated as follows.

Egg meats are poured into the tank. These may be whole eggs, or may be the yolks of eggs, or may be the whites of eggs. The propeller 12 within the tank 10 is set in motion so that it will continuously stir the egg meats. Thereafter the suction pump 17 is energized. A vacuum will be created beneath the screen 28. The vacuum so created will cause the pressure of the atmosphere to force the egg material on screen 28 through the screen, leaving behind the chalaza that is not disintegrated, solid bodies, egg shell, and other forms of solid material which will not readily pass through the screen. During the operation of the device, the scrapers 26 may be rotated. If preferred, the scrapers 26 are used only at intervals. Rotation of the scrapers 26 prevents clogging of the pores of the filter 28 and assists in the disintegration of the egg material. The action of the scraper upon the screen is to release portions of material which are partly drawn through the filter but which are held by cohesion with other portions thereof so that they cannot be drawn entirely through the filter. The scraper acts upon such material, forcing the material through the filter, cutting it up, or moving it away from its position upon the filter. Therefore it is well to have the mixing propeller, the scrapers, and the suction pump functioning concurrently. The egg material which is drawn through the filter by suction or is forced through by the scrapers passes into the conduit 16 through the pump 17 and is discharged from conduit 18 into a suitable can or into a temporary storage tank.

In that embodiment of the invention which is shown in Figure 3, the hopper 30 is identical with tank 10 shown in Figure 1. The tank 30 has a conduit 31 therefrom, a mixing propeller 32 in the side thereof, a vertical shaft 33, scrapers 33a operating upon the vertical shaft, suitable shaft supports and motors, and a filter 34 like filter 28 in Figure 1. The discharge conduit 31 extends to a storage tank 35 which is disposed beneath tank 30, and which has at its bottom a drain cock or valve 36. Tank 35 may have a sight glass 37. It is provided with a cover 38 which has a central sleeve 39 which telescopes over the conduit 31 from the tank 30, the telescoping parts being air-tight. In the cover 38, there may be a vacuum gauge 40 and a vacuum breaker 41 which is a small valve, the opening of which will admit air into the tank 35. Extending from cover 38 is a conduit 42 to a vacuum pump, (not shown), there being a suitable valve 43 in said conduit intermediate the tank 35 and the vacuum pump.

The operation of the form of device shown in Figure 3 is as follows.

Material, whether whole eggs, yolks or whites, is deposited in the mixing and filtering tank 30. The propeller 32 is set in motion and the scrapers preferably are energized. The vacuum pump is put in motion. The vacuum pump draws air from the tank 35 creating a vacuum which can be measured on the gauge 40 in the cover 38. As such vacuum is created, egg material is drawn through the filter 34, and flows down the conduit 31 into the lower tank 35. It is collected therein until the upper tank is emptied. When the lower tank is substantially full, no more material is deposited in the mixing tank. The valve 43 to the vacuum pump is shut off, the vacuum breaker 41 is opened to destroy the vacuum in the tank 35, and the egg material is then ready to be withdrawn through the drain valve 36.

The third form of apparatus which is illustrated in Figure 4 comprises a mixing tank 50, a propeller 51, scrapers 52, a filter 53, and a discharge conduit 54 all being such as are shown in Figures 1 and 3. The discharge conduit 54 has a valve 55 and drain plug 55a therein and extends from the bottom of the mixing tank 50 upwardly and into a storage tank 56. The tank 56 is like that which is shown in Figure 3. The difference between the apparatus shown in Figure 3 and Figure 4 is that the storage tank 56 in Figure 4 is in the same horizontal plane with the mixing tank 50, while the storage tank 35 in Figure 3 is wholly beneath the mixing tank 30.

The storage tank 56 comprises a main body having a sight glass 57 and a cover 58 through which the conduit 54 from the mixing tank empties. It is provided with a vacuum breaker 59, a vacuum gauge 60, and a conduit 61 to a vacuum pump (not shown). The conduit 61 has a suitable valve 62 therein.

In addition there may be supplied a conduit 63 having a valve 64, the conduit 63 being connected to the conduit 61. Conduit 63 runs to carbon dioxide pressure tanks or to a pressure pump (not shown). If the tank 56 is fitted with connections to a pressure pump or to carbon dioxide pressure tanks, it has in its lower section a second filter 65, the construction of which resembles that of the filter in the mixing tank except that scrapers may be omitted. The filter 65 may be called a secondary filter and it operates upon previously thoroughly filtered egg material. The filter 65 excludes, as all secondary filters do, any material which is not desirable that may have accidentally been drawn through the primary filter. If desired, scrapers may be supplied for the secondary filter and the porosity of the secondary filter may be less than that of the first or primary filter. The scrapers will be mounted in substantially the same manner as the scrapers in tanks 30 and 50.

The operation in general of the third form of filter is substantially the same as for the second form described. After material has been drawn into tank 56 the secondary filter may be used. The conduit to the vacuum pump then is closed, and air pressure or carbon dioxide is admitted to the upper part of the storage tank 56, the valve of the vacuum breaker also being closed. The air from the pressure pump, or the carbon dioxide from the pressure tanks, forces the previously filtered egg material resting upon the secondary filter 65 therethrough so that it may be removed by a drain valve 66 at the bottom of the tank 56.

A divisional application, Serial No. 78,336, of the present application was filed on May 7, 1936.

What is claimed as new and is desired to be secured by Letters Patent of the United States:

1. An egg filtering apparatus adapted to filter egg material without the incorporation of air in the material and so avoiding foaming, said apparatus comprising a container for receiving egg material, a filter dividing said container into upper and lower compartments, means for evacuating said lower compartment to suck egg meats from the upper compartment through the filter into the lower compartment, a scraper blade in the upper compartment having one edge thereof adapted to run over the filter and the other edge thereof spaced above the filter and means for rotating said scraper blade to prevent a clogging of the filter and assist in the disintegration of the egg chalaza.

2. An egg filter apparatus adapted to filter egg material without the incorporation of air in the material and so avoiding foaming, said apparatus comprising a relatively deep container for receiving egg material having the top thereof vented to the atmosphere, a foraminous plate dividing said container into upper and lower compartments, a drain for said lower compartment, means for evacuating said drain to reduce the pressure in the lower compartment thereby causing the atmosphere to force egg meats from the upper compartment through the filter into the lower compartment, a blade revolvable on the top side of the plate to cooperate with the holes in the plate for disintegrating the egg chalaza and a stirring device in the upper compartment to uniformly mix the egg meats before they are drawn through the filter.

3. An egg filter apparatus adapted to filter egg material without the incorporation of air in the material and so avoiding foaming, said apparatus comprising an open container for receiving egg material therein and a closed container for receiving filtered egg meats, means joining the bottom of the open container with the closed container to place the containers in communicating relation, a filter extending across the open container near the bottom thereof, a scraper adapted to run over the filter to disintegrate the egg chalaza thereon and means for evacuating the closed container to suck egg meats though the filter into said closed container.

4. An egg filter apparatus comprising a relatively deep container for receiving egg material therein and having side walls, a sloping bottom and an open top, a drain in the lowermost portion of the sloping bottom, a flange secured to the side walls on the inside of said container near the bottom thereof, a filter in said container seated at the edges thereof on said flange, a spider having legs resting on the bottom of the container for supporting the central portion of the filter, said spider having a journal formed therein, a vertical shaft rotatably mounted in said journal at one end thereof and extending above the top of the container, a second spider secured near the top of the container for rotatably supporting the upper portion of the shaft, a scraper secured to said shaft above the filter for cleaning the pores of the filter and disintegrating the egg chalaza thereon, means for rotating said shaft and an evacuating device communicating with said drain to suck egg meats through the filter.

5. An egg filtering apparatus for filtering egg meats without effecting a foaming of the meats comprising a container vented to the atmosphere and adapted to receive broken egg material, a foraminous member in the path of the egg material, means for sucking egg meats from the container through the foramina of said member and a scraper movable in the unfiltered egg material adjacent said member to assist the foramina of the member in disintegrating the egg material and to prevent clogging of the member.

6. An egg filtering apparatus for filtering egg meats without effecting a foaming of the meats comprising a container vented to the atmosphere and adapted to receive broken egg material, a foraminous member in a horizontal position in the path of the egg material, means for sucking egg meats from a space in the container above said member through the foramina of said member and a scraper in said space movable in the unfiltered egg material over and adjacent the top of said member to assist the foramina of the member in disintegrating the egg material and to prevent clogging of the member.

FRANK P LOMAX.